(12) United States Patent
Anderson et al.

(10) Patent No.: US 6,827,384 B2
(45) Date of Patent: Dec. 7, 2004

(54) MODULAR SYSTEM FOR A VEHICLE

(75) Inventors: Kermit M. Anderson, Holland, MI (US); Mark P. Kadzban, Grandville, MI (US); Matthew A. Kalis, Hudsonville, MI (US); Scott T. Williams, Holland, MI (US); Alan G. Greene, Grandville, MI (US); Leif Norland, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/316,162

(22) Filed: Dec. 10, 2002

(65) Prior Publication Data
US 2003/0168875 A1 Sep. 11, 2003

Related U.S. Application Data

(63) Continuation-in-part of application No. 09/846,811, filed on May 1, 2001, now Pat. No. 6,669,260.

(51) Int. Cl.⁷ .............................................. B60R 11/00
(52) U.S. Cl. ..................................... 296/37.8; 224/311
(58) Field of Search .............................. 296/37.8, 37.7; 224/311, 281

(56) References Cited

U.S. PATENT DOCUMENTS

| | | | |
|---|---|---|---|
| 4,241,870 A | | 12/1980 | Marcus |
| 4,844,533 A | * | 7/1989 | Dowd et al. ................ 296/214 |
| 5,388,880 A | * | 2/1995 | Kinane ..................... 296/37.7 |
| 5,522,638 A | * | 6/1996 | Falcoff et al. ............ 296/37.8 |
| 5,676,284 A | | 10/1997 | Schenberg |
| 6,003,925 A | * | 12/1999 | Litke et al. ................ 296/37.8 |
| 6,116,675 A | * | 9/2000 | Iwasawa .................... 296/37.8 |
| 6,126,221 A | * | 10/2000 | Kern ........................ 296/37.7 |
| 6,364,390 B1 | * | 4/2002 | Finneman .................. 296/37.7 |
| 6,412,848 B1 | * | 7/2002 | Ceccanese et al. ........ 296/37.7 |
| 6,619,716 B1 | | 9/2003 | Sturt |
| 2002/0163219 A1 | | 11/2002 | Clark et al. |
| 2003/0184111 A1 | | 10/2003 | Sturt |

FOREIGN PATENT DOCUMENTS

| | | |
|---|---|---|
| EP | 0 361 094 | 4/1990 |
| EP | 0 960 785 A | 12/1999 |
| JP | 10291442 | 11/1998 |
| JP | 2001055091 | 2/2001 |
| WO | WO 99/48724 | 9/1999 |

OTHER PUBLICATIONS

International Search Report for Application No. PCT/US 03/38943, 2 pages.

* cited by examiner

*Primary Examiner*—Joseph D. Pape
(74) *Attorney, Agent, or Firm*—Foley & Lardner LLP

(57) ABSTRACT

A module is disclosed for storing articles in an overhead system of a vehicle. The module includes a housing to engage an elongated member positioned on an interior overhead portion of the vehicle, a closure panel coupled to the housing to provide access to a storage area within the housing, and a first pattern of connection points adapted to interface with a corresponding second pattern of connection points on a sub-module. A method of providing a sub-module for use with a module in an overhead system for a vehicle is also disclosed and includes positioning the sub-module within a storage area of the module, aligning a first pattern of connection points on the module with a second pattern of connection points on the sub-module, and coupling the sub-module to the module.

58 Claims, 11 Drawing Sheets

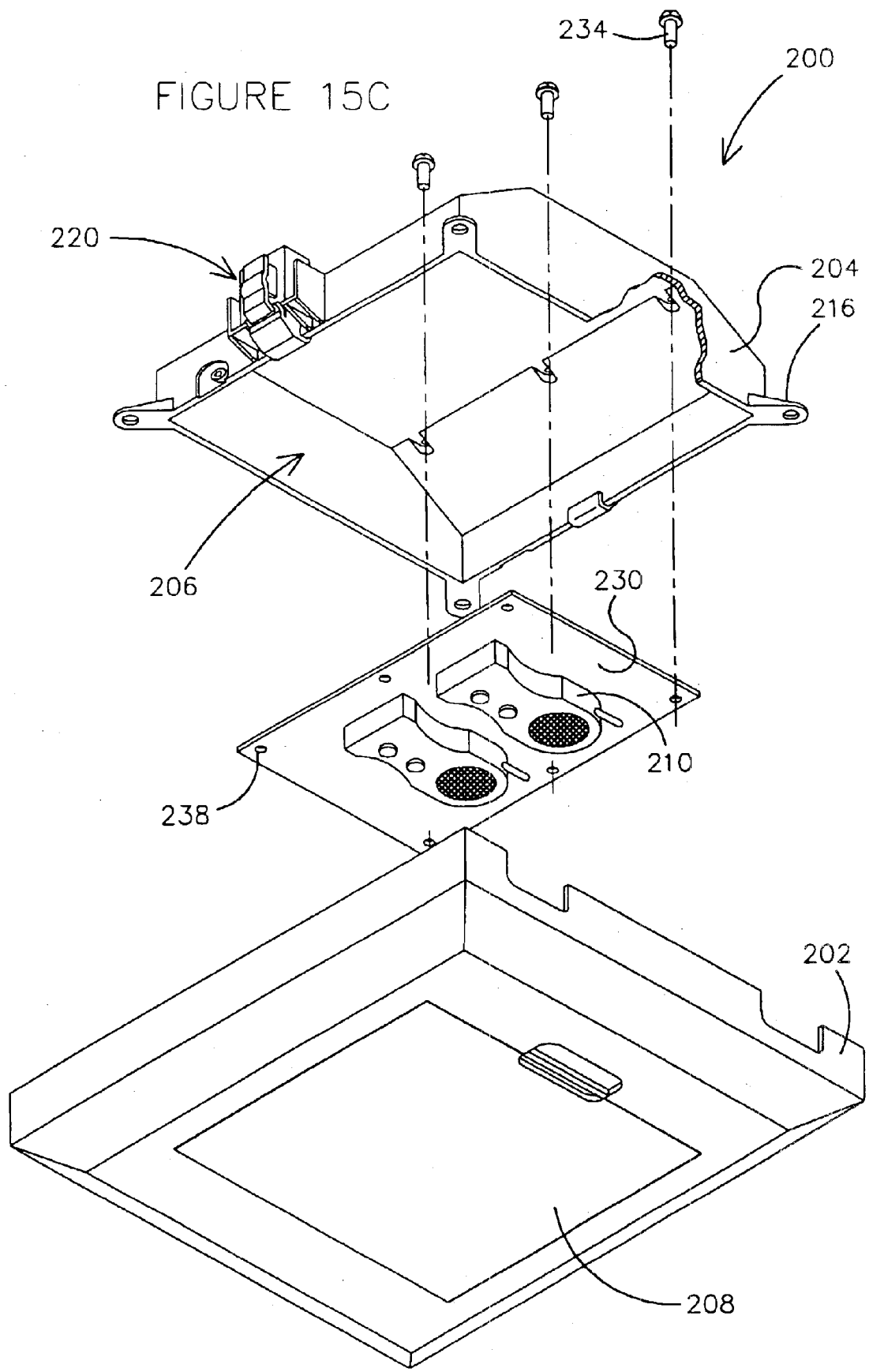

MODULAR SYSTEM FOR A VEHICLE

CROSS REFERENCE TO RELATED APPLICATIONS

The present application incorporates by reference and claims priority to the following patent application: U.S. patent application Ser. No. 09/846,811 titled "Modular System for a Vehicle" filed May 1, 2001 now U.S. Pat. No. 6,669,260.

FIELD OF THE INVENTION

The present invention relates to a modular system for a vehicle. The present invention relates more particularly to a module for use with a modular system for a vehicle.

BACKGROUND OF THE INVENTION

Modular storage compartments in the forward portion of vehicles are generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages.

Accordingly, it would be advantageous to provide a modular system for interchangably mounting a wide array of selectively removable, user-oriented articles that are adapted for use within, or in conjunction with, a vehicle. It would also be advantageous to provide such a modular system along substantially the entire length of the interior overhead portion of a vehicle as well as the interior sides of a vehicle, or within the interior cargo space of a vehicle. It would also be advantageous to provide a modular system that provides concealed distribution of utilities from vehicle utility supply sources to the interchangably selected articles. It would be further advantageous to provide a modular system whereby certain classes of articles are capable of installation only in predetermined portions of a vehicle area to minimize potential distractions to a vehicle operator.

SUMMARY OF THE PREFERRED EMBODIMENTS AND OTHER EMBODIMENTS OF THE INVENTION

The present invention relates to a module for storing articles in an overhead system of a vehicle and includes a housing adapted to engage at least one elongated member positioned on an interior overhead portion of the vehicle, a closure panel coupled to the housing and configured to provide access to a storage area within the housing, and a first pattern of connection points adapted to interface with a corresponding second pattern of connection points on a sub-module.

The present invention also relates to a method of providing a sub-module for use with a module in an overhead system for a vehicle having at least one elongated member coupled to an interior overhead portion of the vehicle. The method includes the steps of positioning the sub-module within a storage area of the module, aligning a first pattern of connection points on the module with a second pattern of connection points on the sub-module, and coupling the sub-module to the module.

The present invention further relates to a kit for mounting sub-modules in an interior overhead portion of a vehicle and includes a housing having an interior storage space, a first pattern of connection points on the housing adapted to operably engage a second pattern of connection points on the sub-module, and at least one utilities connector configured to interface with the module and sub-module.

The present invention further relates to a sub-module for use within a module on an overhead system in a vehicle and includes a bracket having a first pattern of connection points configured to engage a second pattern of connection points on the module in a mounting relationship, an article having a size and a shape adapted to fit within a storage space of the module, and at least one coupler configured to couple the article to the bracket.

The present invention further relates to a module adapted for installation on an overhead system for a vehicle and configured to store a sub-module therein, and includes a housing, a base coupled to the housing and defining a storage area, a holder coupled to at least one of the base and the housing and configured to engage an elongated member of the overhead system, and an interface configured to secure the sub-module within the storage area.

BRIEF DESCRIPTION OF THE DRAWINGS

FIG. 15C is an exploded perspective view of a module adapted to receive other modules according to a preferred embodiment.

DETAILED DESCRIPTION OF THE PREFERRED EMBODIMENTS

Figure 1:
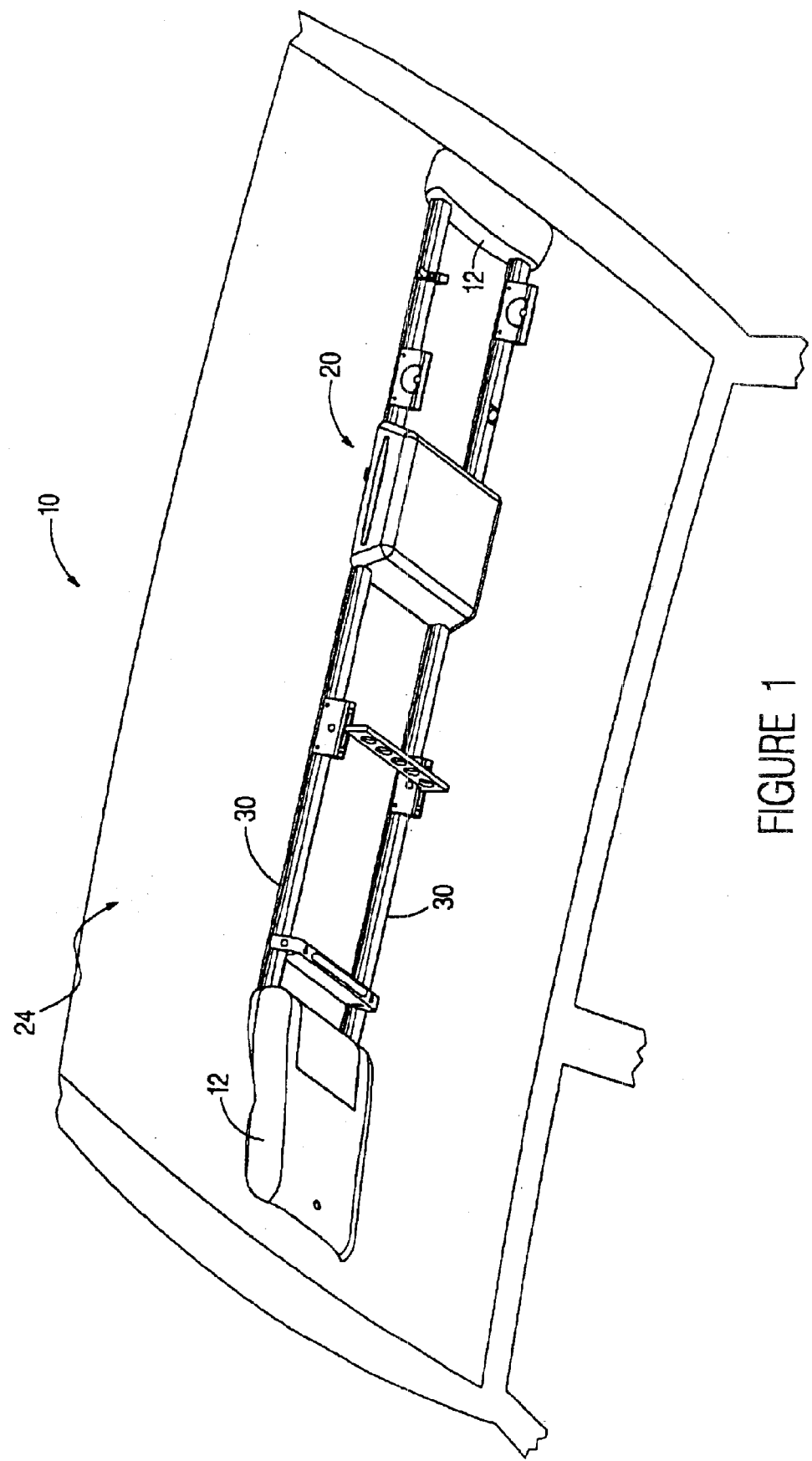
FIG. 1 is an upward-looking perspective view of a modular system mounted on a vehicle interior according to a preferred embodiment.
Figure 2:
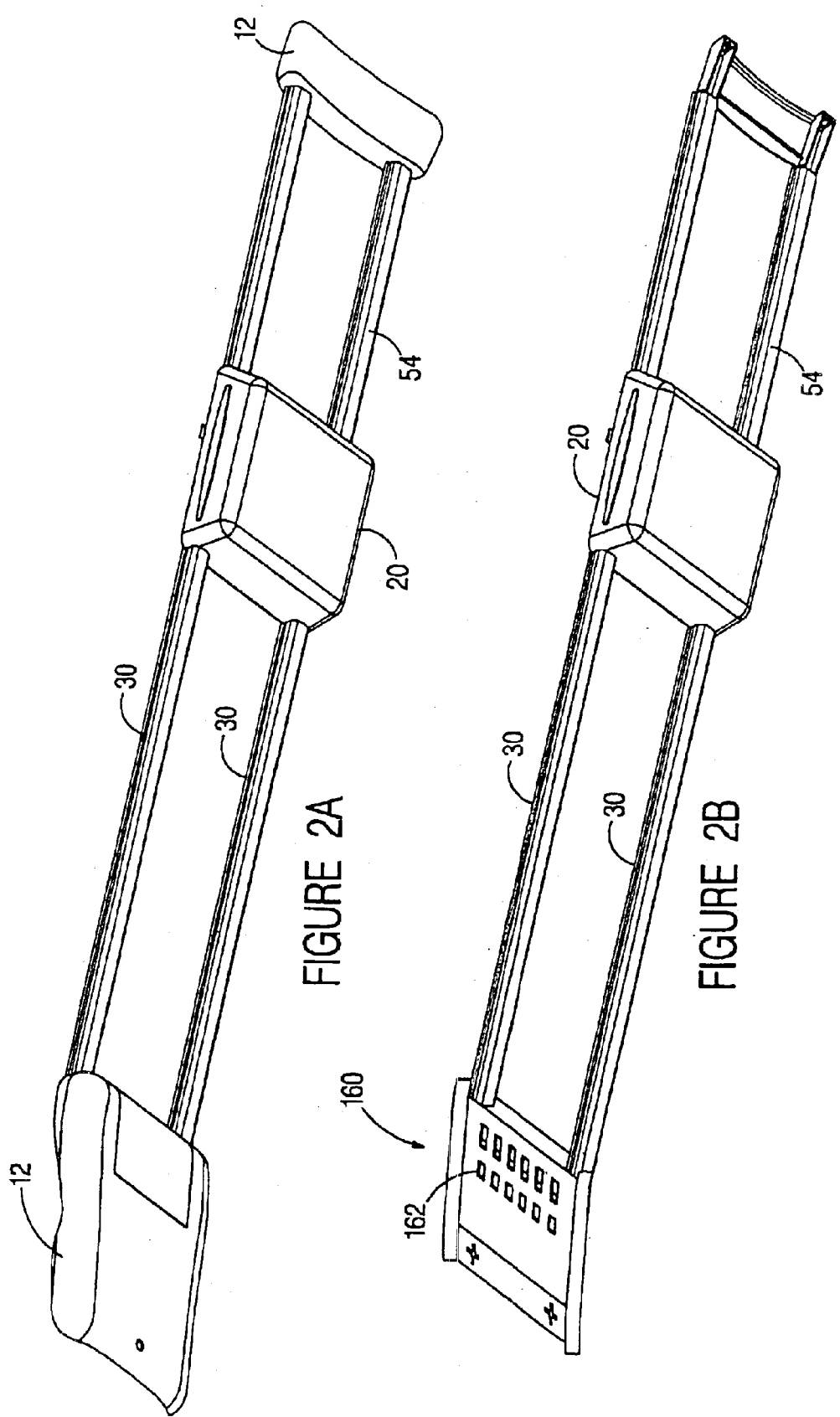
FIG. 2A is an upward looking perspective view of a modular system with end cover trim pieces according to a preferred embodiment.
FIG. 2B is an upward looking perspective view of a modular system with end cover trim pieces removed according to a preferred embodiment.

Referring to FIGS. 1 and 2, a modular system 10 for mounting one or more articles 20 is shown schematically (exemplary articles will be further described herein) along an interior panel 24 (e.g. door or side panel, cover, headliner, etc.) of a vehicle according to a preferred embodiment. System 10 may also be adapted for mounting articles 20 along the sides of the vehicle such as door or side panels, or within the interior space of the vehicle such as cargo areas, in a manner similar to the method described herein. System 10 includes two generally parallel mounting members 30 such as rails, tracks, channels, holders, bars, rods, poles, etc. that are oriented in any desired configuration within a vehicle along interior panel 24. Members 30 have a lateral spacing that is generally fixed for a particular vehicle style, but the spacing may vary between different vehicle styles and models and may have any lateral spacing suitable for mounting articles 20. One or more positioners 31 shown schematically in FIG. 3 may be used to secure the lateral spacing of members 30 for receiving articles 20. For overhead applications, members 30 may be oriented longitudinally centered laterally within the vehicle, but may be located at any lateral position on the interior panel 24 to accommodate mounting of articles 20. In an alternative embodiment, members 30 may be separated into a forward segment and/or a rearward segment (not shown) for adapting to roof windows or other discontinuities in the roof structures. Members 30 may also be oriented laterally along interior panel 24 to increase the flexibility and utility of the system for interchangeably receiving the articles 20. In another alternative embodiment, a single member 30 may be used in conjunction with articles 20 that are adapted to selectively and interchangeably engage a single member 30. In a further alternative embodiment, members 30 may be mounted to pillars (not shown) or other generally vertical support columns within the interior space of a vehicle to provide a system for attaching articles 20. Such pillars may be secured by articles mounted to the members 30 for increased flexibility in attaching articles to the pillar-mounted members.

Figure 6:
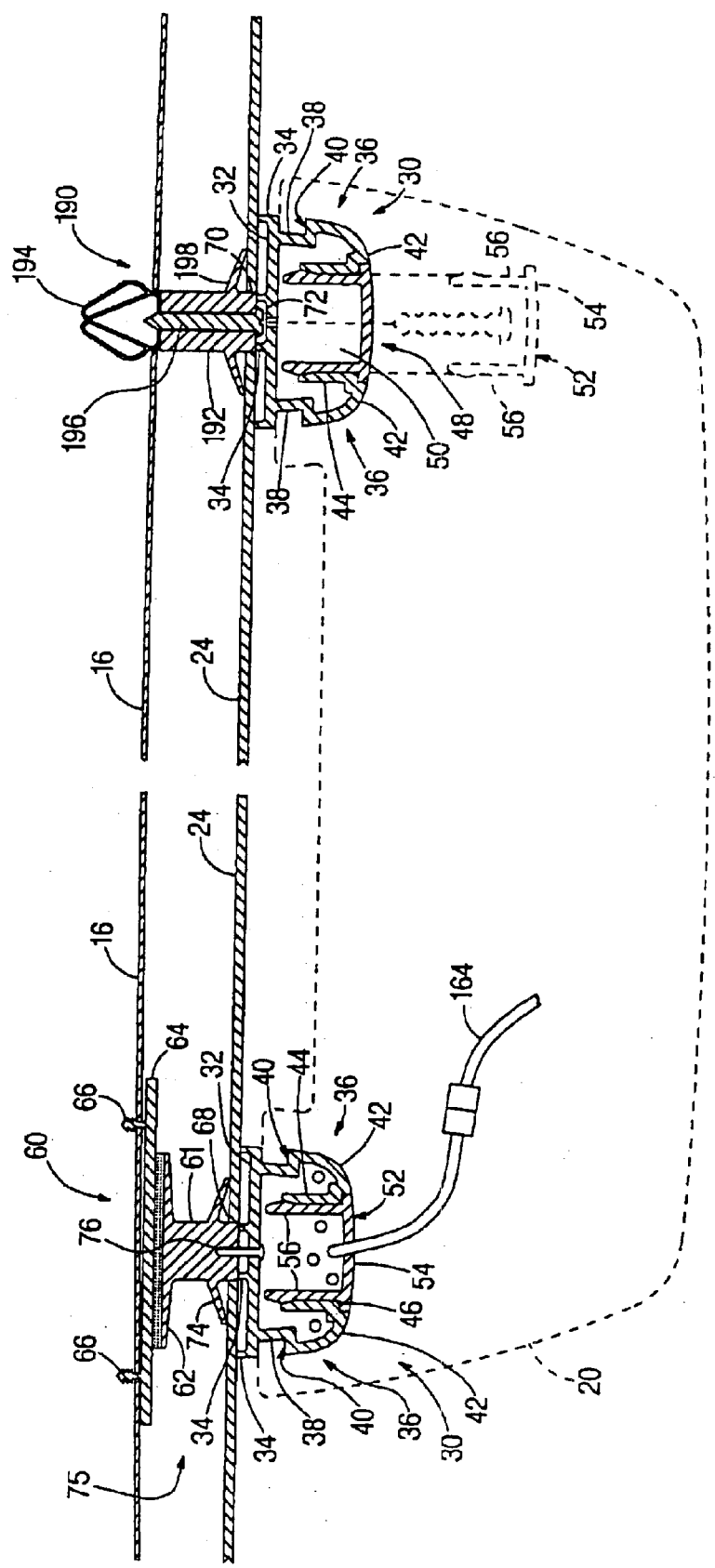
FIG. 6 is a cross sectional view of a modular system along line 6—6 of FIG. 3 according to a preferred embodiment.

Referring to FIG. 6, the structural shape of members 30 are shown according to a preferred embodiment. Members 30 have a generally hollow cross sectional shape as shown in FIG. 6, and include a generally flat base 32 (e.g. back, contact surface, etc.) on the top of member 30 with several longitudinal ribs 34 projecting therefrom. Ribs 34 are provided at the outside edges to grip the surface of interior panel 24 and a pair of ribs 34 are located centrally for alignment with connectors 160 or 60 when members 30 are secured to the roof structure. Members 30 further include integral sides 36 having a recess 38 (e.g. notch, inset, slot, groove, channel, etc.) forming an outwardly projecting supporting ledge 40 (e.g. corner, shoulder, edge, etc.). Recesses 38 and ledges 40 provide an external structure for receiving and supporting the articles 20 (shown schematically) having corresponding structure adapted to mate with ledges 40. In a particularly preferred embodiment, ledge 40 is horizontal (as shown) and ledge 40 and recess 38 are formed having an angle of 90 degrees or less for providing a structure for receiving articles 20. In an alternative embodiment, member 30 may have a circular cross sectional shape (not shown) or any other shape where the exterior surface is configured to provide longitudinal recesses and ledges similar to recesses 38 and ledges 40 for receiving and supporting the articles 20. In another alternative embodiment, member 30 may have a second recess and ledge (not shown) for providing an alternative article mounting interface and providing structure adaptable for mounting interlocks that may prohibit or allow installation of certain articles along particular locations of members 30.

Beneath ledges 40, sides 36 include inwardly curved lower sections 42 that terminate into a return bend 44 providing internal corners 46 to create a longitudinal opening 48. Opening 48 creates a passage 50 (e.g. channel, path, conduit, tunnel, etc.) within members 30 for routing utility carriers such as wires, cables, fiber optics, etc. as shown schematically in FIGS. 5 and 6. A removable cap 52 is provided generally along the entire length of member 30 having a cover 54 to cover opening 48 and retain utility carriers, and may have a flush fit with member 30, or may have projecting contours, ribs, or other decorative or useful structure (not shown). Cap 52 includes two inwardly projecting legs 56 that fit within opening 48 and are removably retained in place by an interference type, snap-fit engagement with return bends 44. Opening 48 may be entirely or partially concealed by inserting one or more caps 52 having segments of various lengths tailored to create an access pattern within members 30. The access pattern may be created or modified at any time for selectively providing access to opening 48 along the length of member 30. Member 30 and cap 52 are preferably made of acrylonitrile butiadene styrene (ABS) plastic in an extrusion process, and may be provided in a wide variety of colors designed to accent an interior trim color scheme. Alternatively, members 30 and cap 52 may be made of aluminum or any other suitable material, wherein members 30 or cap 52 may also serve as a conductor for transmitting low voltage electrical power from a vehicle supply source to articles 20 mounted on members 30. The outer surface of the aluminum members is preferably anodized which provides an insulating layer on the exterior of the member, which may be selectively removed to provide a customtailored electrical conductivity access pattern. Portions of members 30 and cap 52 that are not otherwise enclosed by articles 20 may also have a separate insulating cover (not shown) that snap fits into recesses 38 and ledges 40 to electrically isolate members 30 from consumer contact or inadvertent contact with an electrical ground. Members 30 and cap 52 may also be made of any other material suitable for forming an elongated support member and receiving mounting structure from articles 20 to be supported therefrom.

Figure 4:
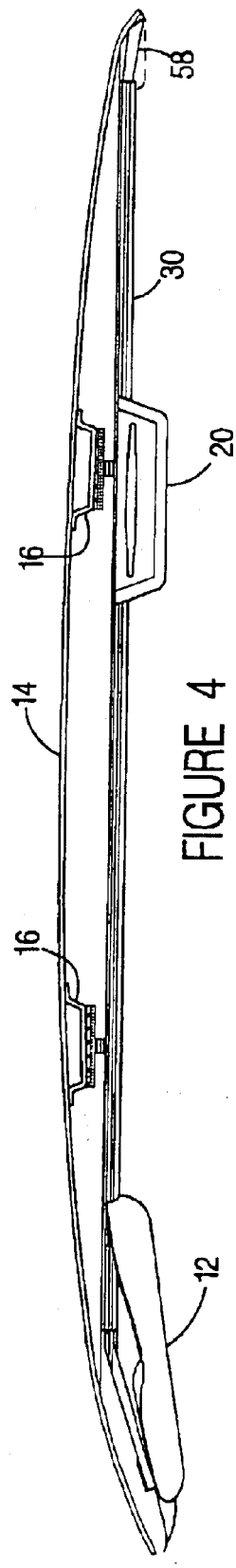
FIG. 4 is a side elevation of a modular system according to a preferred embodiment.

Referring to FIG. 4, members 30 are secured to the vehicle according to a preferred embodiment. The ends of members 30 are rigidly attached to the forward and rearward edges of the roof frame (e.g. beams, headers, bows, crosspieces, etc.—not shown) by welding, brazing or fastening with conventional fasteners (not shown). Members 30 may have ends attached directly to the frame, or members 30 may be attached to the roof frame via fixtures shown schematically as brackets 58. Brackets may also be provided to support the ends of member segments that abut a roof discontinuity such as a sunroof, etc. The forward and rearward end connections of members 30 are covered by suitable trim components shown schematically as a bezel or molding 12. Members 30 may have a side profile that is straight, or a side profile that is slightly curved or bowed (not shown) to correspond with the panel profile 14 (shown as a roof panel). In an alternative embodiment, members 30 may be secured to door panel structures (not shown) or to pillars or other support columns (not shown) within the interior of the vehicle. Such support columns may be permanently fixed to the interior vehicle structure or may be removably or retractably attached to vehicle structure such as the floor, roof or sides of the vehicle to create a modular system for attaching articles within any interior location of a vehicle.

Referring further to FIGS. 4 and 6, a structural support system for the interior span of members 30 is shown according to a preferred embodiment. The interior span of members 30 are coupled to the roof structure of the vehicle using connectors 190 (e.g. Z-axis clips) having a spacer portion 192 with spring clip 194. Fastener 196 may be used to secure member 30 to spacer portion 192 and for securing spacer portion 192 to spring clip 194 to ensure the structural integrity of system 10. Spacer portion 192 may project through an aperture 70 in panel 24 to provide secure abutment with the back of member 30, and supports 198 may project outwardly from spacer portion 192 to provide support to panel 24 around aperture 70. Connectors 190 are attached to one or more lateral frame members 16 (e.g. beams, roof bows, door panels, floor panels, cross headers, etc.) at a lateral position along frame member 16 corresponding to the installation position of members 30. An alternative connector type may also be used such as that shown by connector 60 in FIG. 6. Connectors 60 have a spacer portion 61 and a base portion 62 coupled to a platform 64 that is attached to frame member 16 by finned-plugs 66 (e.g., "Christmas tree connectors") or by a structural adhesive (not shown) such as "BETAMATE 73705" which is a polyurethane adhesive manufactured by the Dow Chemical Corporation and available through Sound Alliance, LLC located in Auburn Hills, Mich. In an alternative embodiment, connectors 60 may be attached to frame member 16 by a two-piece reclosable fastener system (not shown) such as "DUAL LOCK"® having mushroom-head shaped projections and manufactured by the Minnesota Mining and Manufacturing Company, or by a nylon "VELCRO"® hook and fastener structure available from Velcro USA Inc. located in Manchester, N.H. The end of connector 60 opposite from base 62 has a pedestal section 68 that extends through aperture 70 in panel 24 to engage base 32 of members 30. The end of pedestal 68 is configured to abut ribs 34, and an a projection 72 (not shown) may be provided extending from the end of pedestal 68 and configured to be captured between longitudinal ribs 34 to improve lateral stability of members 30. Connectors 60 further include supports 74 (wings, braces, arms, etc.) to support the back surface of panel 24 in the proximity of aperture 70. In a preferred embodiment, connectors 190 and 60 are made from ABS, polycarbonate or other suitable plastic and spring clip 194 is made from heat-treated spring steel or wire, however, connectors 190 and 60 may have any shape and material composition appropriate for transferring the load from system 10 through members 30 to frame member 16, and connector 60 may be attached to frame member 16 by any suitable means providing the appropriate tensile strength. Connectors 190 and 60 have a spacer length corresponding to the gap 75 between frame member 16 and panel 24. Following panel 24 installation over pedestal 68 of connectors 60 in the vehicle, members 30 may be positioned over panel 24 and aligned with connectors 190 or 60, whereby members 30 are secured by a threaded fastener or 196 or 76 through base 32 and into connector 190 or 60. In alternative embodiments, other connector structures may be used such as solid blocks (not shown), and panel 24 may be provided without apertures 70 whereby a fastener penetrates the base, panel and the connector. In another alternative embodiment, members 30 may be bowed into a shallow arch-like profile (not shown) and installed with a compression fit between the forward and rearward ends of the roof frame, or other vehicle structure such as floor and roof panels, thus obviating or minimizing the need for mid-span connectors.

Further, members 30 may be mounted against panel 24, or alternatively panel segments may be positioned around members 30.

Referring further to FIG. 1, a variety of articles 20 may be mounted to members 30 according to a preferred embodiment. Articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. Articles 20 may also include handles, brackets, fixtures (e.g. starter block) for mounting racks, cages, or support pillars for optionally receiving members 30 to mount additional articles 20 in a cargo area, lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use.

Figure 15A:
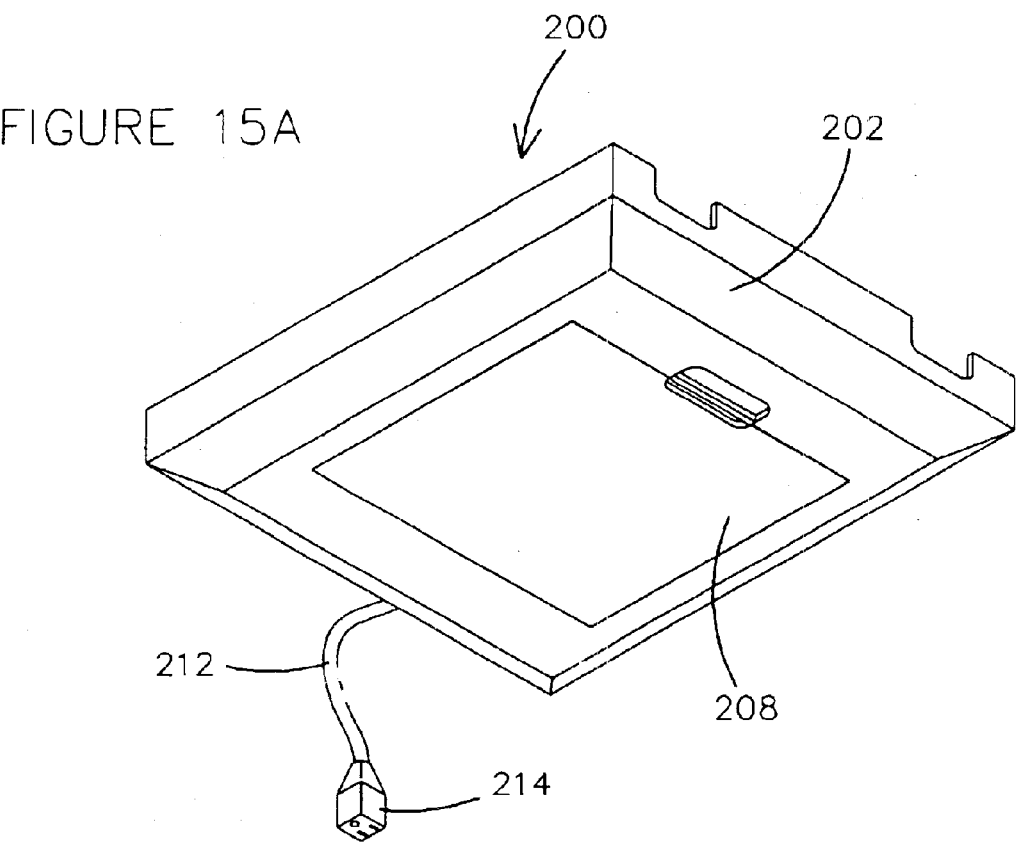
FIG. 15A is a perspective view of a module adapted to receive other modules according to a preferred embodiment.
Figure 15B:
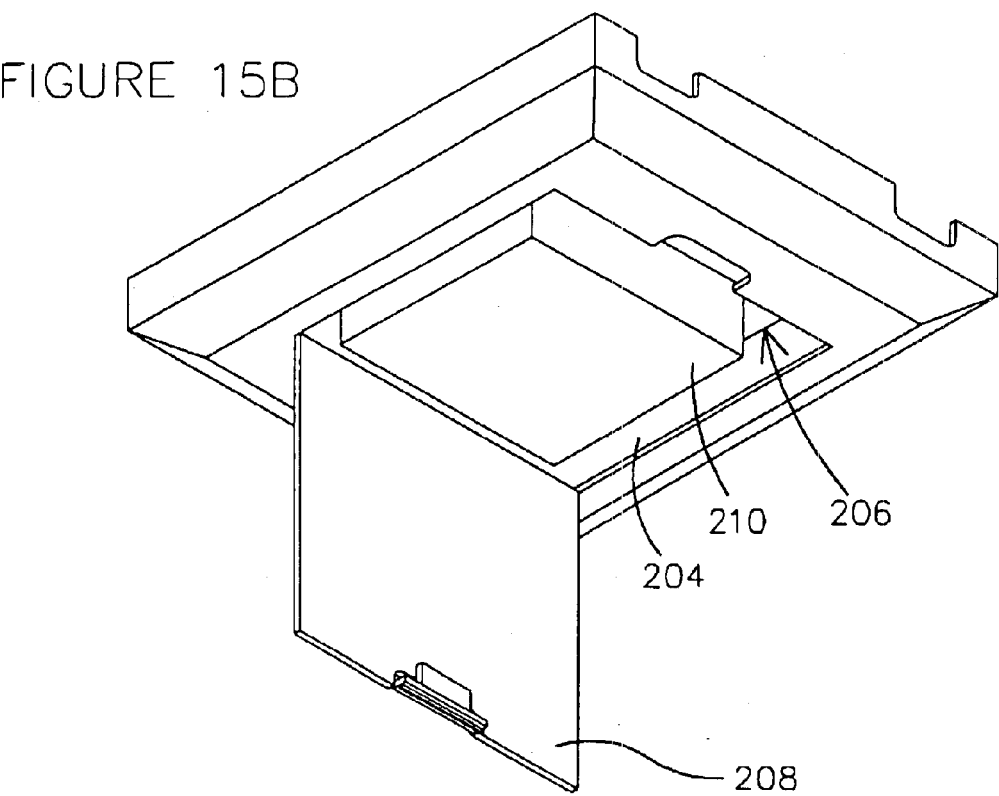
FIG. 15B is a perspective view of a module adapted to receive other modules according to a preferred embodiment.

Referring to FIGS. 15A through 15C an article configured as a module adapted to receive other modules (e.g. sub-modules, etc.) is shown according to a preferred embodiment. Module 200 (e.g. "starter module", "carrier module", etc.) is shown generally as a storage bin or module having a housing 202 (e.g. cover, trim piece, etc.), a base 204 (e.g. liner, receptacle, frame, etc.) defining a storage space 206 (e.g. cavity, hollow, recess, etc.), and a panel 208 (e.g. door, closure, flap, etc.). Base 204 and storage space 206 are configured to receive other modules (e.g. sub-modules 210, etc.—shown schematically as portable radios in FIG. 15C) that may be designed as after-market products or articles for use or installation by consumers, dealers, etc. Sub-modules 210 may be any suitable article configured for use, storage or display within storage space 210 and adapted for use within or exterior to a vehicle. Utilities (e.g. power, voice, data, etc.) may be provided to the sub-modules through suitable utility carriers 212 (e.g. wires, etc.) that may interface with other utility carriers routed through elongated members 30 (as shown schematically in FIG. 6) or above a headliner panel (or other panel such as a door panel, trim panel, etc.) and configured to interface via a suitable connector 214 (e.g. of a conventional type). Utility carrier 212 is adapted to provide utilities (e.g. electrical power, data signals, communication signals, etc.) to the sub-modules via suitable connectors (e.g. of a conventional type—not shown). According to any preferred embodiment, the sub-modules may be DVD players, MP3 players/hard drives, XM radio, Blue Connect module, personal data assistant (PDA) and/or mobile phone charging station, Homelink and TravelNote modules, audio speakers, amplifiers, battery packs, power inverters, first aid kits, hand-held radios (e.g. two-way radios, walkie-talkies, etc.), GPS units, tool kits, extendable lights, fishing tackle boxes, camping modules, a hand-held vacuum cleaner, small appliances, mobile phone holders, hands-free phone systems, personal data assistant (PDA) holders, sunglass holders, CD/DVD holders, garment hanging bars, air purifiers, pet guards, satellite radio receivers, or any other suitable device for installation within a module having a bin or other storage compartment. According to an alternative embodiment, the elongated members may be serve as a conductor for delivering utilities to the sub-modules.

Base 204 is coupled to housing 202 to form a module suitable for receiving sub-modules and attaching to the elongated members 30 (as shown schematically in FIG. 1). According to a particularly preferred embodiment, base 204 is coupled to housing 202 by suitable fasteners (of a conventional type through suitable structure shown schematically, for example, as tabs or bosses 216 in FIG. 15C).

Base 204 further comprises a holder 220 (e.g. clip, clamp, connector, etc.) that may have any suitable form for coupling module 202 to elongated member 30. According to any preferred embodiment, holder 220 may be in the form of any suitable holder, such as but not limited to holder 100,120, 140 or 180 (to be further described in reference to FIGS. 7–14). According to a particularly preferred embodiment, holder 220 is in the form of a holder 180 as shown schematically in FIGS. 7 and 8) and is configured to releasably engage recess 38 and/or ledge 40.

According to a particularly preferred embodiment the sub-modules are mountable to an interface such as a bracket 230 (e.g. shell, frame, support, etc.) that is mountable within storage space 206 so that the sub-modules may be retained within storage space 206 and concealed behind panel 208. Bracket 230 may have any suitable shape or contour for mounting within storage space 206 (e.g. flat as shown schematically in FIG. 15C, but may also be recessed with angled sides, rounded sides, etc.). The sub-modules may be mounted to the bracket in any suitable manner to secure the sub-modules to the bracket. For example, the sub-modules may be attached to the bracket by couplers such as selectively releasable structure such as resilient clips or brackets, straps, hook-and-loop fasteners, slide-locks, twist/turn locks, or any other suitable attachment device (not shown). The bracket may be mounted to the base or the module in any suitable manner to retain the sub-module within the storage space (e.g. spring clips, slot-and-tab connectors, etc.—not shown). According to a particularly preferred embodiment, bracket 230 has a rectangular shape with angled sides 232 that corresponds (e.g. fits, nests, etc.) with the interior overhead shape of the base and storage space within module 200 (as shown in FIG. 16B) and is secured by a series of fasteners 234 (shown schematically as six screws) that are received in corresponding connection points (shown schematically as bosses 236) on base 204. Bosses 236 may be provided in any suitable pattern to provide retention of bracket 230 and sub-module 210 within module 200.

Figure 16A:
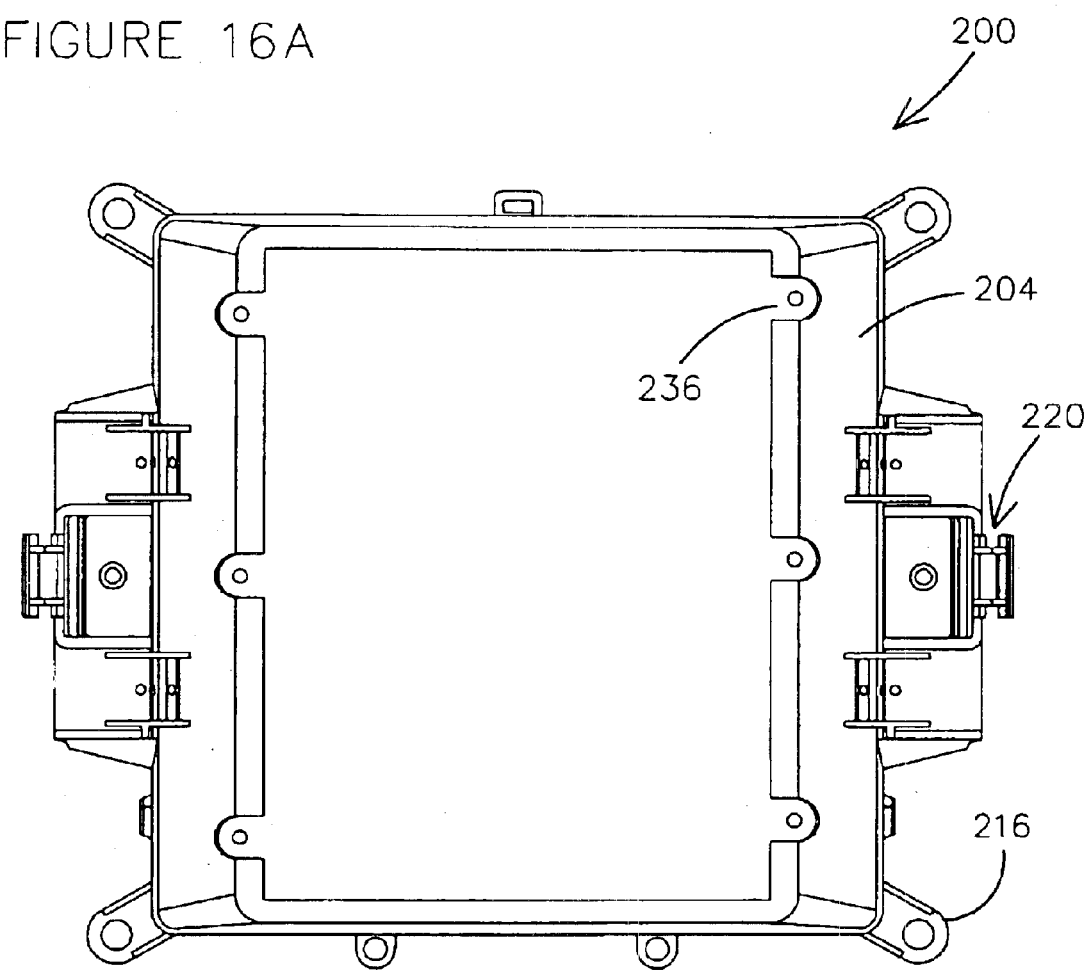
FIG. 16A is a top view of a module adapted to receive other modules according to a preferred embodiment.
Figure 16B:
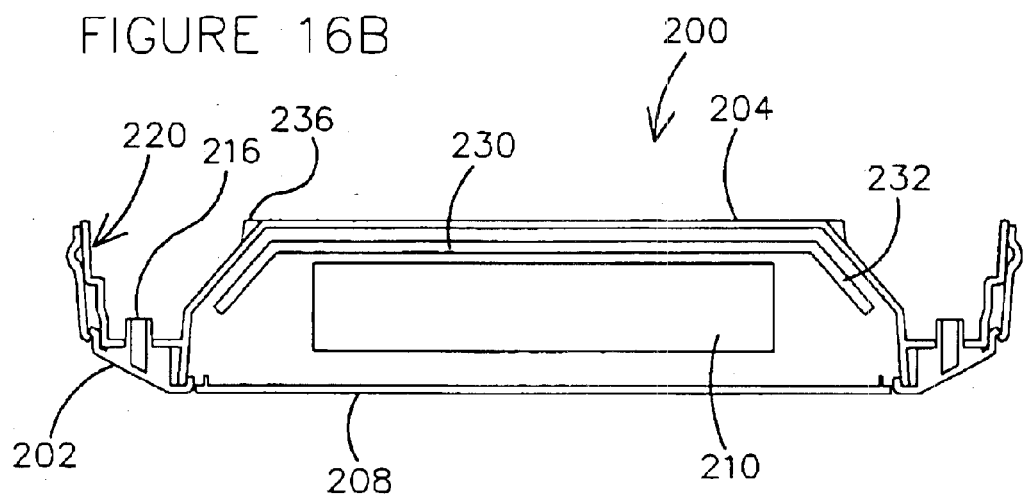
FIG. 16B is an end view of a module adapted to receive other modules according to a preferred embodiment.
Figure 16C:
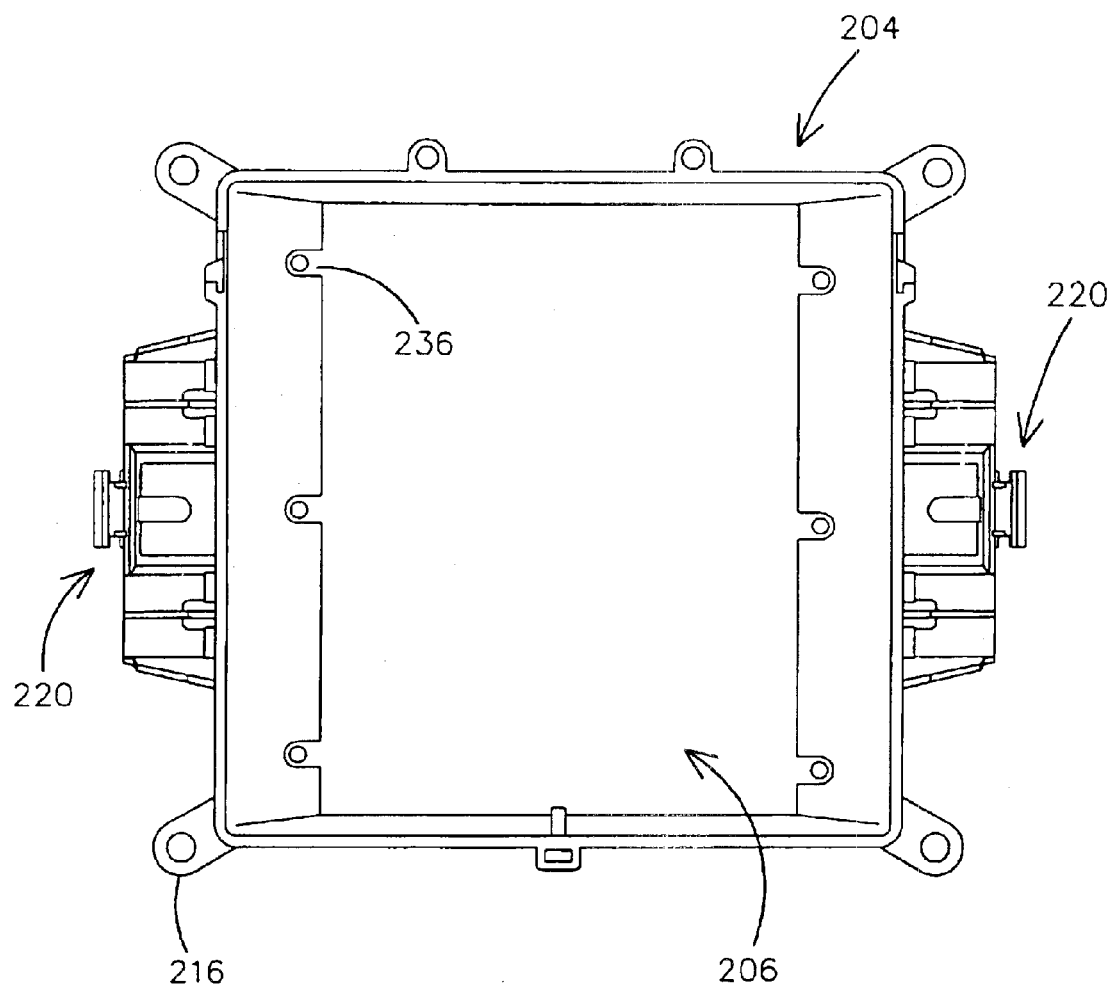
FIG. 16C is a bottom view of a module adapted to receive other modules according to a preferred embodiment.

According to a particularly preferred embodiment, bosses 236 are configured in a pattern that provides three bosses on a first side of the module and three bosses on an opposite side of the module (as shown in FIGS. 16A and 16C). Bracket 230 is configured with a pattern of connection points (shown schematically as apertures 238) that correspond to the pattern on base 204 for attachment of bracket 230 to base 204. Bosses 236 may be provided as non-threaded and apertures 238 in bracket may be threaded to receive fasteners 234 such that bracket 230 may be secured to the inside of module 200 within storage area 206 in a manner that conceals the fasteners from when viewed from the interior of the vehicle. According to an alternative embodiment, the bracket may attach within the module in any suitable manner, such as by snap-fit, twist-lock connectors, slide-locks, magnetic attraction, adhesive, hook and loop fasteners (e.g. VELCRO®, etc.) or other conventional attachment devices. According to another alternative embodiment, fasteners (e.g. threaded fasteners, etc.) may be used in any pattern and attachment configuration that is suitable for mounting the bracket within the module. According to a further alternative embodiment, the pattern of connection points on the module and bracket may be provided in a non-symmetric configuration that permits the bracket to be installed in only one orientation within the storage area. According to a further alternative embodiment, the bracket may be omitted and the sub-modules may be attached directly to the base. According to a further alternative embodiment, the panel may have retention structure (e.g. pocket, slots, tabs, clips, brackets, etc.) on an inward side of the panel to secure the sub-modules to an interior side of the panel such that the sub-module may be concealed within the storage space when the panel is in a closed position and the sub-modules may be accessed from the panel when the panel is moved to an open position.

According to any preferred embodiment, the carrier module is configured to provide an internal storage space and connection points in a pattern adapted to receive a sub-module having a bracket or other suitable structure having a corresponding pattern of interfacing connection points. The base and the bracket may be provided in any shape or contour and adapted to releasably retain a wide variety of articles that may stored within the carrier module. The pattern of interfacing connection points may utilize any suitable type of connectors and provided in any suitable pattern for coupling the sub-module to the module. The sub-modules may be non-energized (or otherwise configured for use without a utility supply) or may be energized (or otherwise configured to interface with a utility supply) from the vehicle.

Articles 20 are adapted to be selectively positionable along members 30, however, articles that may deemed to create a distraction to the vehicle operator, such as video displays and the like, are provided with a mounting interlock feature which prevents their installation in certain prohibited positions along the members, for example, allowing video monitors to be installed only in a rearward portion of the vehicle. The interlock function may be accomplished by altering the cross sectional shape or profile of a portion of the members (not shown) or providing a second recess and ledge (not shown). Particular articles 20 may be provided with a mounting profile for engaging members 30 that includes a projection (not shown) that extends into passage 50 whereby installation of a blank (not shown) within a particular portion of passage 50 along member 30 will prevent mounting such articles in the selected locations. Alternatively installation of articles may be selectively restricted by otherwise altering the profile of the members to fit only selected article mounting profiles and may be accomplished by adding a shim (not shown) along one or more sides of member 30 or in connection with the passageway of the member.

Articles 20 suitable for suspension from a single member are configured for attachment to a single member 30 by having means for releasably connecting to the recess 38 and ledge 40 on each side of a member 30. Articles 20 that are more suitable for suspension from two members 30 are configured having a first means on one side of the article for attaching to the recess 38 and ledge 40 on one or both sides of the first member 30, and are configured having a second means on the opposite side of the article for attaching to the recess 38 and ledge 40 on one or both sides of the second member.

Figure 7:
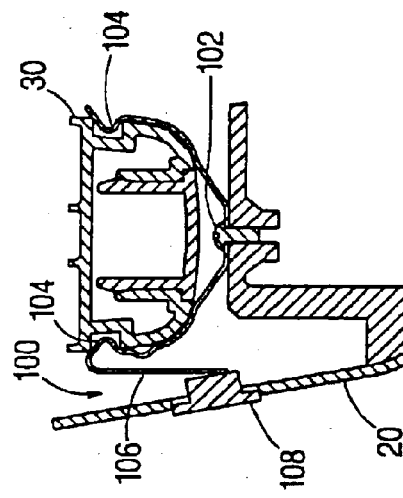
FIG. 7 is a cross sectional view of an attachment in an engaged position for a modular system along line 7—7 of FIG. 5 according to a preferred embodiment.
Figure 8:
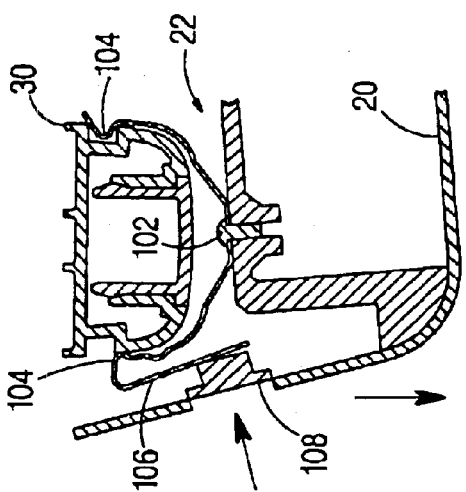
FIG. 8 is the cross sectional view of FIG. 7 for the attachment in a released position for a modular system according to a preferred embodiment.

Referring to FIGS. 7 and 8, a component for attaching articles 20 to members 30 are shown according to a preferred embodiment. A holder 180 (e.g. clamp, spring, clip, etc.) is positioned within an attachment profile 22 (e.g. channel, slot, groove, recess, valley, indent, etc.) on article 20 to align with member 30 and is attached to article 20 by a conventional fastener 102 (shown as a threaded screw but may include finned plugs, adhesive, integral formation, etc.). Holder 180 is configured to resiliently conform to the exterior of member 30 and includes catches 184 (e.g. tabs, ears, dogs, etc.) that are biased inwardly to retain catches 184 within recesses 38 on one or both sides of member 30, whereby catches 184 are vertically supported by ledges 40. An article 20 is removably attached to a member 30 by aligning holder 180 beneath member 30 and exerting force on article 20 whereby catches 184 are forced around sides 36 and catches 184 resiliently fit within recesses 38, where ledge 40 is preferably horizontal (as shown) or angled upwardly and outward to form an angle of 90 degrees or less with recess 38 to ensure secure retention of catch 184. Holder 180 includes an extension 186 fastened to a pivoting latch 188 on an article 20. Extension 186 may be located on either side of holder 180 for an article 20 adapted for suspension from a single member 30, and extension 186 is located on exterior side of holder 180 for articles 20 adapted to be suspended from two members 30. Pulling downward (or outward) on latch 188 causes catch 184 to release from recess 38 and allow article 20 to be removed from member 30. The additional leverage created by releasing a holder 180 from a member 30 on a first side of article 20 allows the holder 180 on a second member to be removed by rotating article 20 in a downward (or outward) direction. In an alternative embodiment, an actuator and a clip having an extension may be positioned on each side of an article for improved ease in removing the article from members 30. In a particularly preferred embodiment, holder 180 is made from spring steel stock having dimensions of approximately 1 millimeter thick but may be in the range of 0.5–2.0 millimeters or other dimensions suitable for providing a resilient holding function for an article 20. However, other materials having suitable dimensions and the appropriate rigidity and resiliency such as plastic or hard rubber may be used for holders in alternative embodiments. Catches 184 on holder 180 may be adapted to engage recesses 38 having a height of approximately 9.2 millimeters and a depth of approximately 3.1 millimeters, but may be the height in the range of 7 to 11 millimeters and the depth may be in the range of 2 to 5 millimeters or any other suitable dimensions according to customer specifications. Catches 184 on holder 180 may also be adapted to engage recesses 38 on each lateral side of member 30 wherein the lateral space between the interior of recesses is approximately 33.8 millimeters, but may be in the range of 26 to 40 millimeters or any other dimensions suitable according to customer specifications. In other alternative embodiments having articles 20 adapted for suspension from two members, a holder on one side of an article may be replaced by a rigid fixture (not shown) designed to engage an exterior recess on a member, whereby the rigid fixture is positioned in place first, then the holder on the opposite side is rotated upward (or inward) and into an engaged position on its respective member.

Figure 9:
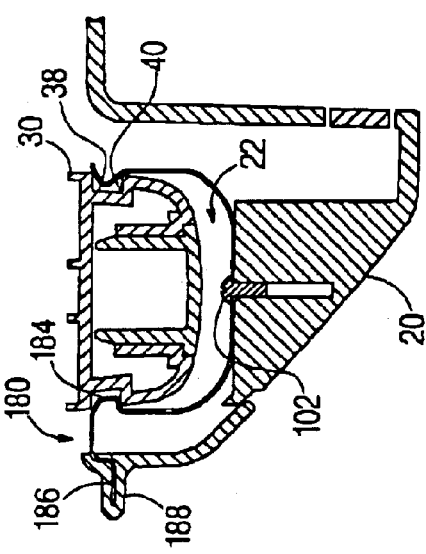
FIG. 9 is the cross sectional view of FIG. 7 for the attachment in an engaged position for a modular system according to an alternative embodiment.
Figure 10:
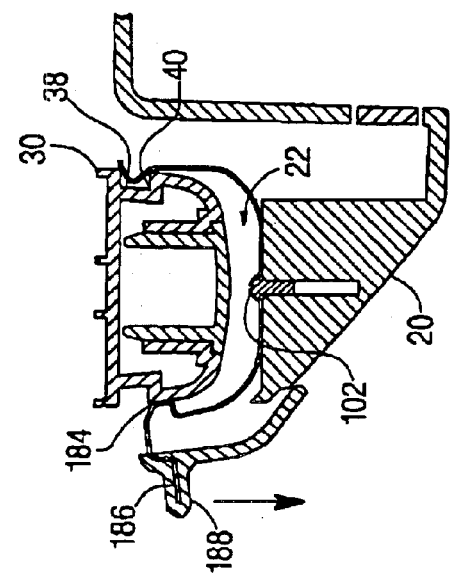
FIG. 10 is the cross sectional view of FIG. 7 for the attachment in a released position for a modular system according to an alternative embodiment.

Referring to FIGS. 9 and 10, a component for attaching articles 20 to members 30 are shown according to an alternative embodiment. A holder 100 (e.g. clamp, spring, clip, etc.) is positioned within an attachment profile 22 (e.g. channel, slot, groove, recess, valley, indent, etc.) on article 20 to align with member 30 and is attached to article 20 by a conventional fastener 102 (shown as a threaded screw but may include finned plugs, adhesive, integral formation, etc.). Holder 100 is configured to resiliently conform to the exterior of member 30 and includes catches 104 (e.g. tabs, ears, dogs, etc.) that are biased inwardly to retain catches 104 within recesses 38 on one or both sides of member 30, whereby catches 104 are vertically supported by ledges 40. An article 20 is removably attached to a member 30 by aligning holder 100 beneath member 30 and exerting aforce on article 20 whereby catches 104 are forced around sides 36 and catches 104 resiliently fit within recesses 38, where ledge 40 is preferably configured horizontally (as shown) or angled upward and outward to form an angle of 90 degrees or less relative to recess 38. Holder 100 includes an extension 106 configured to resiliently contact an actuator 108 (e.g. pushbutton, etc.) on an article that has a relative vertical position below ledge 40. Extension 106 may be located on either side of holder 100 for an article 20 adapted for suspension from a single member 30, and extension 106 is located on exterior side of holder 100 for articles 20 adapted to be suspended from two members 30. Extension 106 has a return bend generally in the shape of an inverted "U" and has sufficient stiffness so that manually depressing actuator 108 will outwardly deflect catch 104 sufficiently to clear ledge 40 by simultaneously pulling downward on article 20. The additional leverage created by releasing a holder 100 from a member 30 on a first side of article 20 allows the holder 100 on a second member to be removed by rotating article 20 in a downward (or outward) direction. In an alternative embodiment, an actuator and a clip having an extension may be positioned on each side of an article for improved ease in removing the article from members 30. In other alternative embodiments having articles 20 adapted for suspension from two members, a holder on one side of an article may be replaced by a rigid fixture (not shown) designed to engage an exterior recess on a member, whereby the rigid fixture is positioned in place first, then the holder 100 on the opposite side is rotated upward (or inward) and into an engaged position on its respective member 30.

Figure 11:
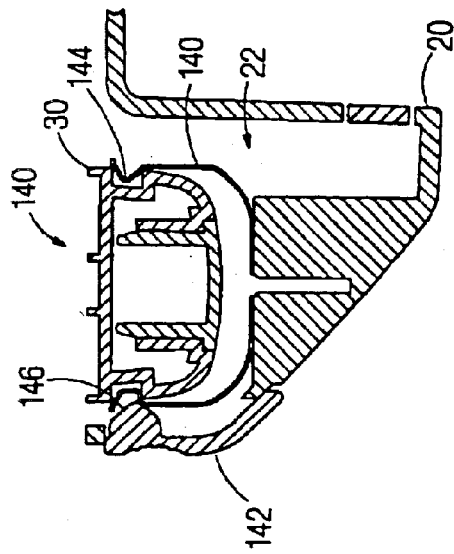
FIG. 11 is the cross sectional view of FIG. 7 for the attachment in an engaged position for a modular system according to another alternative embodiment.
Figure 12:
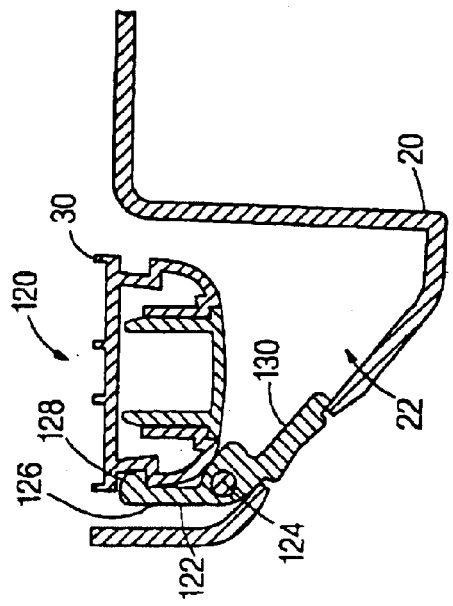
FIG. 12 is the cross sectional view of FIG. 7 for the attachment in a released position for a modular system according to another alternative embodiment.

Referring to FIGS. 11 and 12, a component for attaching articles 20 to members 30 is provided according to another alternative embodiment. A holder 120 includes a latch 122 (e.g. hook, catch, clasp, etc.) pivotally attached to article 20 at pivot 124 in a position aligned with an outward side of a member 30. Latch 122 has an upper end 126 above pivot 124 with a projection 128 extending inwardly therefrom that is shaped to engage recess 38 and ledge 40 of member 30. Latch 122 also has a lower end 130 below pivot 124 that includes an actuator portion 132 cooperating with an aperture 134 in article 20. Latch 122 is biased so that projection 128 is urged inwardly and actuator 132 is urged outwardly. Biasing of latch 122 may be accomplished by a coil spring (not shown) operating about the axis of pivot 124, or by a leaf spring (not shown) positioned between article 20 and upper end 126. Latch 122 is shown having an obtuse angle shape but may have any suitable shape adapted to provide an actuator surface on article 20 and for engaging member 30. Latch 122 may be used in conjunction with an article adapted for suspension from a single member 30, where a single latch 122 is used to engage recess 38 one side of a member 30, and article 20 includes a rigid structure (not shown) designed to engage recess 38 on the opposite side of member 30. Such an article 20 may be removably attached to member 30 by inserting the rigid structure over ledge 40 and exerting a force on the opposite side of article 20 whereby latch 122 resiliently rides over outward side 36 of member 30 and engages recess 38. Latch 122 may also be used in conjunction with an article 20 adapted for suspension from two parallel members 30, where a latch 122 is positioned on one or both sides of article 20 to engage a recess 38 and ledge 40 on the outward side 36 of members 30. Where a latch 122 is used on only one side of such an article 20, a rigid structure (not shown) would be provided on the opposite side of article 20, whereby article 20 is installed by first engaging the rigid structure to recess 38 and then exerting an upward (or inward) force on the opposite side of article 20 whereby latch 122 resiliently rides over outward side 36 of member and engages recess 38. In any configuration, article 20 may be selectively released by depressing actuator 132 to disengage projection 128 from recess 38 and then pulling and/or rotating article 20 downward (or outward).

Figure 13:
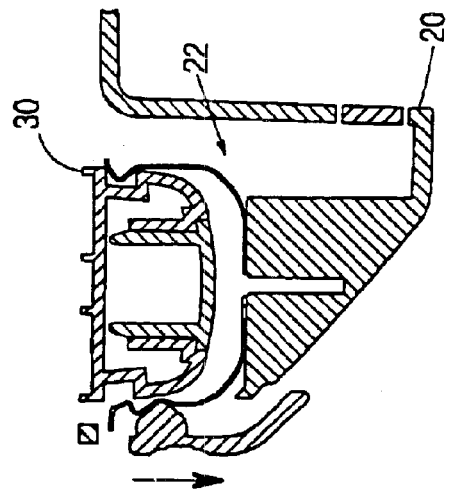
FIG. 13 is the cross sectional view of FIG. 7 for the attachment in an engaged position for a modular system according to a further alternative embodiment.
Figure 14:
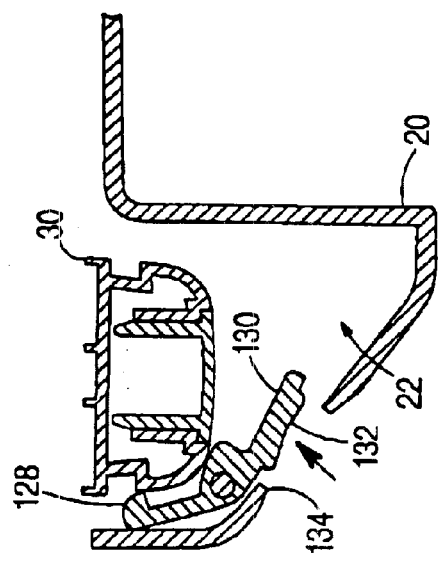
FIG. 14 is the cross sectional view of FIG. 7 for the attachment in a released position for a modular system according to a further alternative embodiment.

Referring to FIGS. 13 and 14, a component for attaching articles 20 to members 30 is provided according to a further alternative embodiment. A latch 142 is coupled to article 20 and configured for vertical sliding engagement with a holder 140. Holder 140 is coupled to article 20 and positioned for alignment with member 30. Holder 140 is generally "U" shaped to fit around member 30, and configured with inwardly projecting catches 144 for engaging recesses 38. The side of holder 140 oriented to engage latch 142 is outwardly biased whereby sliding latch 142 downward will allow catches 144 to deflect outward for removal or installation of article 20. Latch 142 is coupled to article 20 in a manner that permits vertically slidable operation, whereby detent 146 on latch 142 provides a resistance closure with latch 142 in the upward position and catch 144 engaged within recess 38.

In yet another alternative embodiment, the holders may be replaced with fasteners (e.g. set screws configured to engage recess 38, etc.) that may be loosened for installation of article 20 on members 30 and then the fastener may be tightened to secure the article to the member, or loosened for subsequent repair, replacement, or reorientation within the vehicle.

Figure 3:
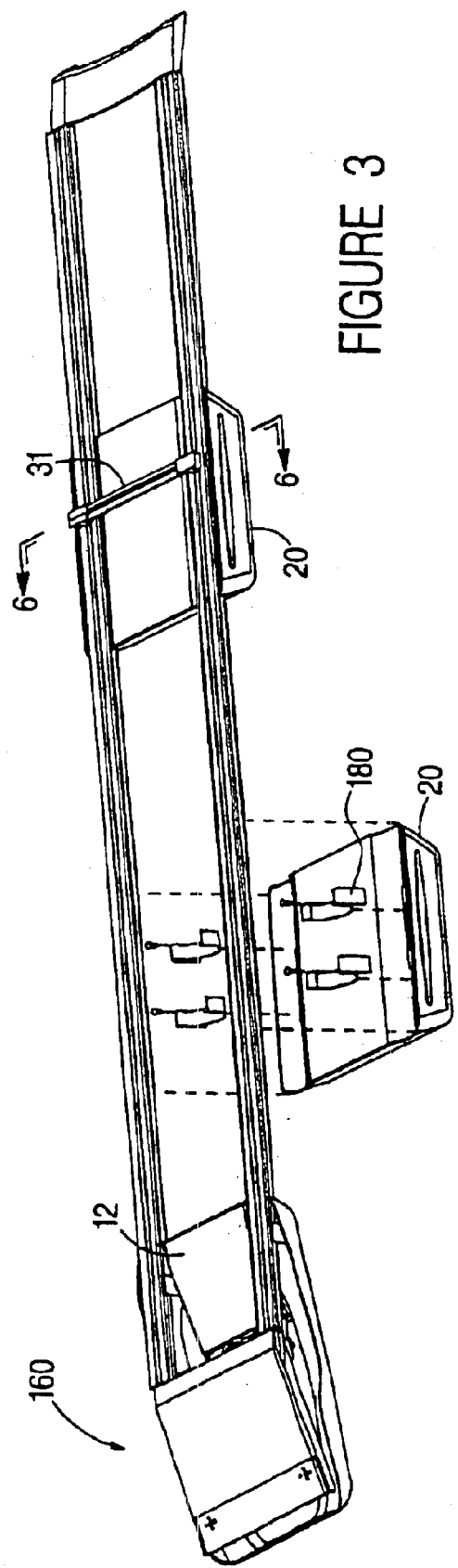
FIG. 3 is a downward looking perspective view of a modular system according to a preferred embodiment.
Figure 5:
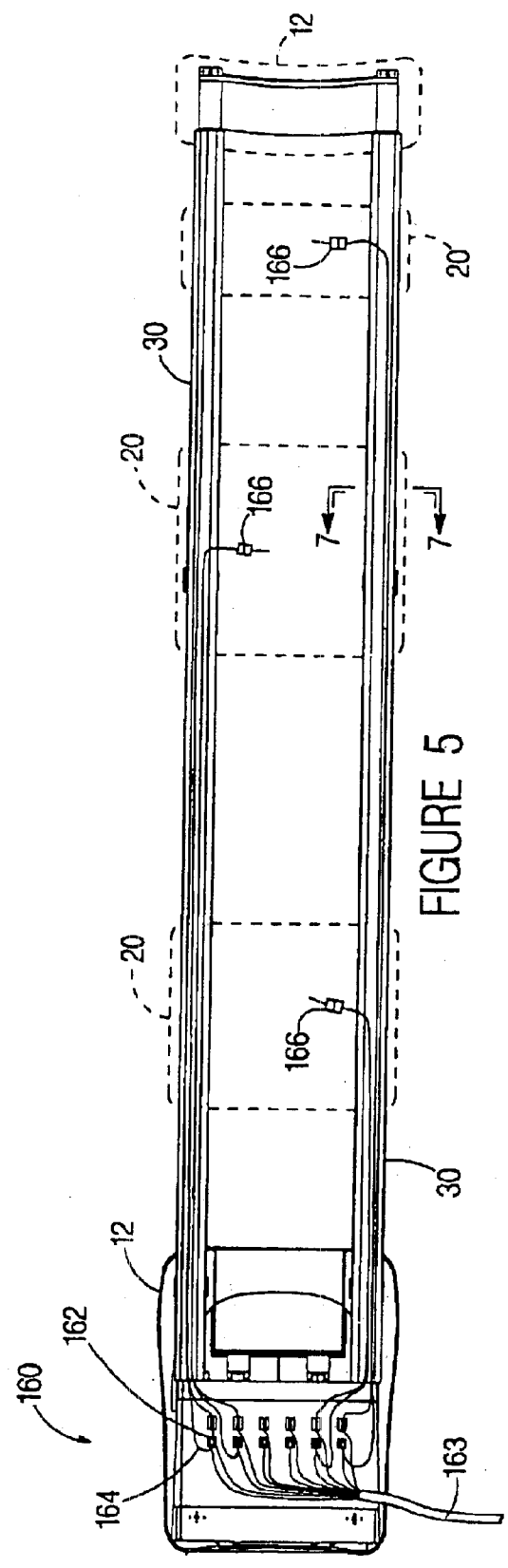
FIG. 5 is an upward looking bottom view of a modular system according to a preferred embodiment.

Referring to FIGS. 3 and 5, a utility interface 160 for system 10 is shown schematically according to a preferred embodiment. Interface 160 is included within the cover 12 for communicating with passageways through the roof structure (not shown) and interfacing with members 30. Interface 160 includes a series of ports 162 (e.g. connectors, receptacles, jacks, plugs, etc.) for facilitating the interconnection of conventional utility carriers 163 (e.g. wires, cables, conductors, harnesses, etc.) for delivering utilities (e.g. electrical power, voice and data communication signals, RF transmission signals, instrumentation signals, etc.) between a supply source (not shown) and articles 20 mounted to members 30. Utilities may be routed from the utility supply source (e.g. a battery, antenna, receiver, transmitter, etc.—not shown) through utility carriers 163 that interconnect the supply source and the ports 162 provided in interface 160. Utility interface 160 may be provided in either the forward or rearward portion of the vehicle.

In a preferred embodiment, utilities may be distributed from interfaces 160 via additional utility carriers 164 that interconnect between interfaces 160 and articles 20. The utility carriers 164 may be distributed throughout system 10 by routing the carriers 164 through passage 50 in members 30 where the carriers 164 are concealed behind cover 54 (shown in FIG. 6) and articles 20. Articles 20 are mounted over members 30 and their covers segments 54, whereby one or more gaps or other openings corresponding to access and egress locations for utilities carriers 164, interfacing with articles 20 may be provided in cover 54, behind article 20, to create a utilities access pattern. The access pattern is adaptable to future changes or modifications in the article selection package by making suitable changes in the removable cover 54 of members 30. Articles 20 and utility carriers 164 may be provided with mating connectors 166 to facilitate ease of installation, replacement or reconfiguration of articles 20 within the system 10. Alternatively, articles 20 may be provided with a fixed length of utility carrier for routing through passage 50 to interface 160, where the carrier includes a terminal at the outward end configured for directly connecting with interface 160. To provide additional flexibility in distributing utilities to various articles, an article 20 may be configured to serve as a utility storage or junction box for housing additional utility distribution devices or components and for storing excess quantities of utility carrier that may be desirable for accommodating future changes to the article selection package.

In an alternative embodiment, low-voltage electrical power in the range of approximately 12–42 volts DC or other suitable voltage range for powering articles 20 may be routed to articles 20 via members 30, where members 30 are fabricated entirely or partially from aluminum or other electrically conductive material. Members 30 may also be fabricated from a non-conducting material such as plastic, where a conducting material such as copper or aluminum is integrally formed with member 30 in the shape of a longitudinal conducting strip, rail or bar (not shown) to provide a uniform electric current access path from interface 160 to articles 20. Such conducting material may be affixed to member 30 by ultrasonic welding, molding, interference-type snap insert, or vacuum metallization. Articles 20 are provided with an electrically conductive contactor (not shown) that projects outwardly from a surface of article 20 and is configured to contact member 30 or a conducting strip thereon (not shown) and remains concealed between member 30 and article 20 when article 20 is installed on member 30 to provide a conductive electrical path to article 20. The contactor may be spring-biased for urging the contactor into continuous contact with member 30 or a conducting strip when article 20 is mounted on members 30. In a preferred embodiment where a system with two parallel members are used, one member 30 would have a positive electrical polarity (i.e. battery potential) and the second member 30 would have a negative electrical polarity (i.e. ground). For embodiments using a single member, two longitudinal conducting strips (not shown) may be used on member 30 to provide positive and negative conductors, corresponding to appropriately positioned contactors on an article 20 configured to mount to a single member 30.

Conducting strips may be used as an article positioning interlock along members 30 by altering the conducting strip longitudinal position along member 30 to provide a power interlock profile. The power interlock profile ensures that contactors for certain articles will properly interface with the conducting strips only when articles are installed at locations on members 30 corresponding to a mating conducting strip position. For example, video display articles may have contactors positioned to match a conducting strip position corresponding only to a location rearward of the front seats of the vehicle. Similarly, other consumer articles that may create a distraction to a vehicle operator may be electrically interlocked so that they are operable only when installed in positions that are preestablished by the power interlock profile. Insulating cover segments (not shown) may be provided that are adapted to cover portions of members 30 that remain exposed after installation of the article selection package to prevent consumer exposure or electrical shorts to ground with the energized portions of system 10.

It is important to note that the construction and arrangement of the elements of the modular system for a vehicle provided herein is illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, colors, combinations of shapes, etc.) without materially departing from the novel teachings and advantages of the invention. For example, the modular system may be used in the interior of any vehicle (such as an automobile, truck, sport utility vehicle, van, boat, airplane, train, construction or farming equipment, tractor trailer trucks, motor homes and recreational vehicles, etc.). Further, the carrier modules may be provided in any suitable shape and may use any suitable type and pattern of connectors for attaching sub-modules in a manner to store or conceal the sub-modules when not in use, and to provide access to the modules when desired by a user. According to other alternative embodiments, the modular system may be used in connection with articles such as camping gear that are designed to adapt to a stationary vehicle environment. Further, it is readily apparent that elongated members may be provided in a wide variety of shapes, sizes, thickness, and engagement profiles and adapted for installation along the roof, floor and sides of a vehicle, or within a cargo area or other suitable location within a vehicle. It is also readily apparent that the articles may be designed with any profile suitable for attaching to one or more members and may be adapted for slidable movement along the members. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A module for storing a sub-module in an overhead system of a vehicle, comprising:
    a housing adapted to engage at least one elongated member positioned on an interior overhead portion of the vehicle;
    a closure panel coupled to the housing and configured to provide access to a storage area within the housing;
    a first pattern of connection points adapted to interface with a corresponding second pattern of connection points for securing the sub-module within the storage space.

2. The module of claim 1 wherein the module is adapted to interface with a bracket on the sub-module.

3. The module of claim 1 wherein the first pattern of connection points is a plurality of bosses.

4. The module of claim 3 wherein the plurality of bosses is six bosses.

5. The module of claim 1 wherein the second plurality of connection points is a plurality of apertures.

6. The module of claim 5 wherein the plurality of apertures is six apertures.

7. The module of claim 6 wherein the apertures are threaded.

8. The module of claim 1 further comprising a plurality of fasteners configured to couple the module and the sub-module at the connection points.

9. The module of claim 8 wherein the fasteners are threaded fasteners.

10. The module of claim 1 wherein the module is adapted to receive the sub-module in a nesting relationship.

11. The module of claim 1 wherein the closure panel is coupled to the housing by a hinge and configured for movement between an open and a closed position.

12. The module of claim 11 wherein the closure panel is adapted to conceal the sub-module when the closure panel is in the closed position.

13. The module of claim 1 further comprising a utility carrier.

14. The module of claim 13 further comprising at least one connector adapted to deliver a utility supply to the sub-module.

15. A method of providing a sub-module for use with a module in an overhead system for a vehicle having at least one elongated member coupled to an interior overhead portion of the vehicle, comprising:
    positioning the sub-module within a storage space of the module;
    aligning a first pattern of connection points on the module with a second pattern of connection points on the sub-module;
    coupling the sub-module to the module; and
    coupling the module to the elongated member.

16. The method of claim 15 further comprising the step of coupling the module to the overhead system.

17. The method of claim 16 further comprising the step of connecting at least one utilities connector configured to communicate between the module and the sub-module.

18. The method of claim 15 wherein the first pattern of connection points is a plurality of bosses and the second plurality of connection points is a plurality of apertures configured to be coupled by a plurality of threaded fasteners.

19. The method of claim 18 wherein the first and second pattern of connection points are six connection points.

20. A kit for mounting sub-modules to at least one rail member in an interior portion of a vehicle, comprising:
a housing having an interior storage space;
a connector configured to couple the housing to the rail member;
a first pattern of connection points on the housing adapted to operably engage a second pattern of connection points on the sub-module so that the sub-module is attachable to the housing; and
at least one utilities connector configured to interface with the module and sub-module.

21. The kit of claim 20 wherein the housing further comprises a cover panel configured to selectively conceal the sub-module.

22. The kit of claim 20, wherein the first pattern of connection points is a plurality of bosses.

23. A module for use with a sub-module on a modular system having at least one rail member in a vehicle, comprising:
a base coupled to a housing;
a connector coupled to at least one of the base and the housing and configured to attach the module to the rail member;
a bracket having a first pattern of connection points configured to engage a second pattern of connection points on the base in a mounting relationship;
the sub-module having a size and a shape adapted to fit within a storage space of the module; and
at least one coupler configured to couple the sub-module to the bracket.

24. The module of claim 23 further comprising at least one utilities connector adapted to interface between the module and the sub-module.

25. The module of claim 23 wherein the coupler is a releasable coupler configured to permit the sub-module to be selectively removed from the bracket.

26. The module of claim 23 wherein the first pattern of connection points and the second pattern of connection points are at least partially aligned.

27. The module of claim 26 wherein the first pattern of connection points are a plurality of apertures.

28. The module of claim 27 wherein the apertures are threaded and adapted to receive a threaded fastener.

29. A module adapted for installation on an overhead system for a vehicle and configured to store a sub-module therein, comprising:
a housing;
a base coupled to the housing and defining a storage area;
a holder operably coupled to at least one of the base and the housing and configured to engage an elongated member of the overhead system; and
an interface configured to secure the sub-module within the storage area.

30. The module of claim 29 further comprising a utilities connector adapted to deliver a utility supply from the vehicle to the sub-module.

31. The module of claim 29 wherein the interface is a bracket.

32. The module of claim 29 further comprising a panel coupled to the housing for pivotal movement between a first position and a second position.

33. The module of claim 32 wherein the sub-module is concealed within the storage area when the panel is in the first position and the sub-module is accessible when the panel is in the second position.

34. A sub-module adapted for placement within a storage space of a module that is configured to attach to at least one elongated member disposed on an interior surface of a vehicle, the sub-module comprising:
an article adapted for placement within the vehicle;
the article having an interface with at least one first connection configured to operably engage at least one second connection on the module;
so that the article is configured to couple to the at least one elongated member.

35. The sub-module of claim 34 wherein the connectors comprise threaded fasteners.

36. The sub-module of claim 34 wherein the connectors comprise straps.

37. The sub-module of claim 34 wherein the connectors comprise resilient clips.

38. The sub-module of claim 34 wherein the connectors comprise a snap-fit device.

39. The sub-module of claim 34 wherein the connectors comprise slide locks.

40. The sub-module of claim 34 wherein the connectors comprise adhesive.

41. The sub-module of claim 34 wherein the connectors comprise a magnet.

42. The sub-module of claim 34 wherein the connectors comprise a twist lock.

43. The sub-module of claim 34 wherein the connectors comprise a hook-and-loop fastener.

44. The sub-module of claim 34 wherein the interface is configured for permanent placement of the article within the module.

45. The sub-module of claim 34 wherein the interface is configured for removable placement of the article within the module.

46. The sub-module of claim 34 wherein the interface is a bracket.

47. The sub-module of claim 34 wherein the interface is a frame member.

48. The sub-module of claim 34 wherein the article is exposed for access by a user.

49. The sub-module of claim 34 wherein the article is configured for concealment behind a panel of the module for selective access by a user.

50. The sub-module of claim 49 wherein the article is configured for placement within a pocket coupled to the panel.

51. The sub-module of claim 34 further comprising a connector configured to provide, utilities to the article.

52. The sub-module of claim 34 wherein the article is an aftermarket product configured for installation within the module.

53. A sub-module adapted for use with a module having a housing and a frame defining a storage space therein and configured to attach to at least one rail member disposed on an interior portion of a vehicle, the sub-module comprising:
an article adapted for placement at least partially within the storage space;
a coupler configured to couple the article to the frame;
so that the article is configured to be removably coupled to the interior portion of the vehicle and is at least partially concealed within the storage space.

54. The sub-module of claim 53 wherein the article is configured to nest with the frame.

55. The sub-module of claim 53 wherein the article is configured to be removably coupled to the frame.

56. The sub-module of claim 53 wherein the article is an aftermarket product configured for installation within the module.

57. The sub-module of claim 53 wherein the article further comprises a connector configured to transmit utilities for the article.

58. The sub-module of claim 53 wherein the article is configured to be concealed behind a door panel coupled to the housing.

* * * * *

UNITED STATES PATENT AND TRADEMARK OFFICE
CERTIFICATE OF CORRECTION

PATENT NO. : 6,827,384 B2
DATED : December 7, 2004
INVENTOR(S) : Kermit M. Anderson et al.

It is certified that error appears in the above-identified patent and that said Letters Patent is hereby corrected as shown below:

Column 14,
Line 6, following "system" delete "." .

Column 16,
Line 49, following "provide" delete "," .

Signed and Sealed this

Fifth Day of April, 2005

JON W. DUDAS
*Director of the United States Patent and Trademark Office*